(12) United States Patent
Ironside et al.

(10) Patent No.: US 12,545,148 B2
(45) Date of Patent: Feb. 10, 2026

(54) SEAT ALGORITHMS

(71) Applicant: Tactual Labs Co., New York, NY (US)

(72) Inventors: Daniel Ironside, Austin, TX (US); Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 74 days.

(21) Appl. No.: 18/034,674

(22) PCT Filed: Nov. 1, 2021

(86) PCT No.: PCT/US2021/057498
§ 371 (c)(1),
(2) Date: Apr. 28, 2023

(87) PCT Pub. No.: WO2022/094369
PCT Pub. Date: May 5, 2022

(65) Prior Publication Data
US 2023/0398908 A1  Dec. 14, 2023

Related U.S. Application Data

(60) Provisional application No. 63/108,343, filed on Oct. 31, 2020.

(51) Int. Cl.
| | | |
|---|---|---|
| B60N 2/00 | (2006.01) | |
| G01B 7/14 | (2006.01) | |
| G06T 3/40 | (2024.01) | |
| G06T 11/20 | (2006.01) | |

(52) U.S. Cl.
CPC ............. *B60N 2/0035* (2023.08); *G01B 7/14* (2013.01); *G06T 3/40* (2013.01); *G06T 11/206* (2013.01); *B60N 2220/20* (2023.08)

(58) Field of Classification Search
CPC .............. B60N 2/0035; B60N 2220/20; B60N 2230/20; G06T 11/206; G06T 3/40; G01B 7/14; B60R 21/015
See application file for complete search history.

(56) References Cited

U.S. PATENT DOCUMENTS

| | | | | |
|---|---|---|---|---|
| 2018/0267653 A1* | 9/2018 | Holman | ................... | G06F 3/015 |
| 2019/0018534 A1* | 1/2019 | Holman | ................... | G06F 3/014 |
| 2019/0042032 A1* | 2/2019 | Moseley | ................ | G06F 3/0446 |
| 2019/0121424 A1* | 4/2019 | Moseley | ................ | G06F 3/0421 |
| 2019/0317642 A1* | 10/2019 | Moseley | ................ | G06F 3/0448 |
| 2020/0086817 A1* | 3/2020 | Moseley | ................ | G06F 3/015 |

* cited by examiner

*Primary Examiner* — Eman A Alkafawi
*Assistant Examiner* — Suresh K Rajaputra
(74) *Attorney, Agent, or Firm* — Adam B. Landa

(57) ABSTRACT

A sensing system determines movement and position of passengers and objects within a vehicle. The sensing system comprises a group a group of transmitting antennas operably connected to a car seat, each transmitting antenna adapted to transmit a signal that is orthogonal to each other signal transmitted during an integration period; a plurality of receiving antennas, each one of the plurality of receiving antennas adapted to receive transmitted signals; and a processor adapted to determine a measurement of the transmitted signals received and create a heatmap, wherein a heatmap summation is taken during no-touch events, compared to a baseline heatmap, and a new baseline heatmap recalibrated if a threshold is exceeded.

20 Claims, 1 Drawing Sheet

SEAT ALGORITHMS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of sensing, and in particular to enhancing sensing within a vehicle environment.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
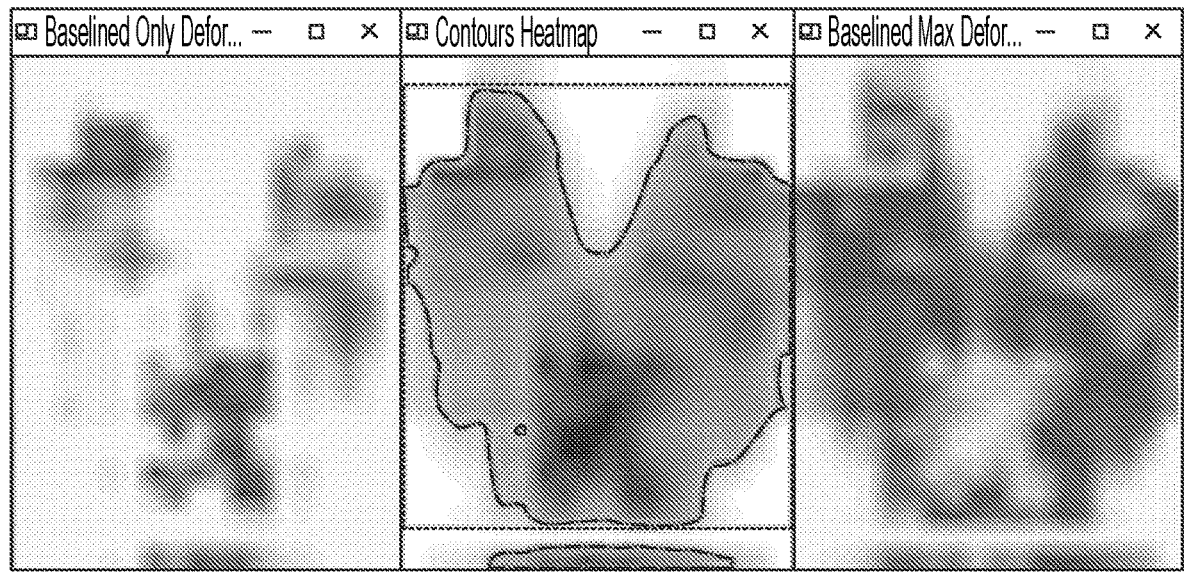
FIG. 1 shows processed heatmap images of a user sitting on a vehicle seat.
Figure 2:
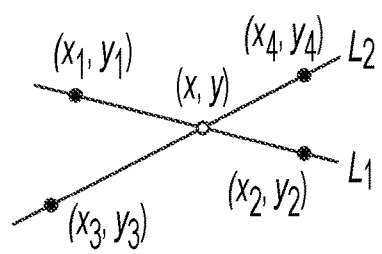
FIG. 2 shows a Line-Line intersection.

In various embodiments, the present disclosure is directed to sensing systems sensitive to the determination of movement and position of passengers and objects within a vehicle. In particular, the determination of the position and movement of occupants and objects can be enhanced by providing methods and algorithms that are able to refine measurements made. The sensing system is able to transmit a plurality of signals during a transmission period and use the sensed signals during a frame in order to create different heat maps that represent movement and position of person during an integration period. By utilizing various algorithms, the system is able to better determine the position and movement of an occupant or object.

Throughout this disclosure, the term "event" may be used to describe periods of time in which movement and/or position of a body or object is determined. In accordance with an embodiment, events may be detected, processed, and/or supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristics. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The present application contemplates various embodiments of sensing systems. The sensing systems described herein are suited for use with frequency-orthogonal signaling techniques (see, e.g., U.S. Pat. Nos. 9,019,224 and 9,529,476, and 9,811,214, all of which are hereby incorporated herein by reference). The sensing systems discussed herein may be used with other signal techniques, including scanning or time division techniques, and/or code division techniques. It is pertinent to note that the sensing systems described and illustrated herein are suitable for use in connection with signal infusion (also referred to as signal injection) techniques and apparatuses. Signal infusion is a technique in which a signal is transmitted to a person, that signal being capable of travelling on, within and through the person. In an embodiment, an infused signal causes the object of infusion (e.g., a hand, finger, arm or entire person) to become a transmitter of the signal.

The presently disclosed systems and methods further involve principles related to and for designing, manufacturing and using capacitive based sensors and capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors having concepts that are germane to and able to be used in connection with the presently disclosed sensors. In the aforementioned sensors, interactions are sensed when a signal from a row conductor is coupled (increased) or decoupled (decreased) to a column conductor and the result detected from that column conductor. By sequentially exciting the row conductors and measuring the coupling of the excitation signal at the column conductors, a heatmap reflecting capacitance changes of the sensor, and thus proximity to the sensor, can be created. The entire disclosure of these patents and applications incorporated therein by reference are incorporated herein by reference.

This application also employs principles used in fast multi-touch sensors and other interfaces disclosed in the following: U.S. Pat. Nos. 9,933,880; 9,019,224; 9,811,214; 9,804,721; 9,710,113; 9,158,411; 10,191,579; 10,386,975; 10,175,772; 10,528,201. Familiarity with the disclosure, concepts and nomenclature within these patents is presumed. The entire disclosure of these patents and applications incorporated therein by reference are incorporated herein by reference. This application also employs principles used in fast multi-touch sensors and other interfaces disclosed in the following: U.S. patent applications Ser. Nos.; 15/195,675; 15/904,953; 15/905,465; 15/943,221; 16/102,185; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Certain principles of a fast multi-touch (FMT) sensor have been disclosed in the patent applications discussed above. Orthogonal signals may be transmitted into a plurality of transmitting antennas (or conductors) and information may be received by receivers attached to a plurality of receiving antennas (or conductors). In an embodiment, receivers "sample" the signal present on the receiving antennas (or conductors) during a sampling period ($\tau$). In an embodiment, signal (e.g., the sampled signal) is then analyzed by a signal processor to identify touch events (including, e.g., actual touch, near touch, hover and farther away events that cause a change in coupling between a transmitting antenna (or conductor) and receiving antennas (or conductor)). In an embodiment, one or more transmitting antennas (or conductors) can move with respect to one or more receiving antennas (or conductors), and such movement causes a change of coupling between at least one of the transmitting antennas (or conductors) and at least one of the receiving antennas (or conductors). In an embodiment, one or more transmitting antennas (or conductors) are relatively fixed with respect to one or more receiving antennas (or conductors), and the interaction of the signal and/or signals transmitted with environmental factors causes a change of coupling between at least one of the transmitting antennas (or conductors) and at least one of the receiving antennas (or conductors). The transmitting antennas (or conductors) and receiving antennas (or conductors) may be organized in a variety of configurations, including, e.g., a matrix where the crossing points form nodes, and interactions are detected by processing of received signals. In an embodiment where the orthogonal signals are frequency orthogonal, spacing between the orthogonal frequencies, $\Delta f$, is at least the reciprocal of the measurement period $\tau$, the measurement period $\tau$ being equal to the period during which the column conductors are sampled. Thus, in an embodiment, the received at a column conductor may be measured for one millisecond ($\tau$) using frequency spacing ($\Delta f$) of one kilohertz (i.e., $\Delta f=1/\tau$).

In an embodiment, the signal processor of a mixed signal integrated circuit (or a downstream component or software) is adapted to determine at least one value representing each frequency orthogonal signal transmitted to (or present on) a row conductor (or antenna). In an embodiment, the signal processor of the mixed signal integrated circuit (or a downstream component or software) performs a Fourier transform on the signals present on a receive antenna (or conductor). In an embodiment, the mixed signal integrated circuit is adapted to digitize received signals. In an embodiment, the mixed signal integrated circuit (or a downstream component or software) is adapted to digitize the signals present on the receive conductor or antenna and perform a discrete Fourier transform (DFT) on the digitized information. In an embodiment, the mixed signal integrated circuit (or a downstream component or software) is adapted to digitize the signals present on the received conductor or antenna and perform a Fast Fourier transform (FFT) on the digitized information— an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as the term frequency orthogonal is used herein, two signals are considered frequency orthogonal if substantially all of the contribution of one signal to the DFT bins is made to different DFT bins than substantially all of the contribution of the other signal.

When sampling, in an embodiment, received signals are sampled at at least 1 MHz. In an embodiment, received signals are sampled at at least 2 MHz. In an embodiment, received signals are sampled at at least 4 Mhz. In an embodiment, received signals are sampled at 4.096 Mhz. In an embodiment, received signals are sampled at more than 4 MHz. To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmitting antenna. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to signal strength for that bin. In an embodiment, the square root of the sum of the squares of the I and Q components is used as measure corresponding to signal strength for that bin.

Further discussion regarding the implementation of the transmitting antennas (or conductors) and receiving antennas (or conductors) in association with vehicles can be found in U.S. Pat. Nos. 10,572,088, 11,112,905, and U.S. patent application Ser. No. 17/166,326, the contents of all of the aforementioned applications incorporated herein by reference.

In an embodiment, the material of a seat has embedded within it a sensing system formed of transmitting and receiving antennas (also referred to herein as conductors) that function in the manner set forth above. In an embodiment, the material of the seat has placed on it a sensing system formed of transmitting and receiving antennas that function in the manner set forth above. In an embodiment, the seat has embedded within it and placed upon it sensing systems formed of transmitting and receiving antennas that function in the manner set forth above.

In an embodiment, antennas are placed upon a flexible substrate (which could be made from a non-conductive fabric, plastic or elastomeric material) and used to form the material of the seat. In an embodiment, antennas are embedded within a flexible substrate and used to form the material of the seat. In an embodiment, a conductive thread is placed on or stitched into a flexible material (e.g., fabric) in a manner that permits a desired expansion (e.g., zig-zag, waves, etc.) in one or more desired dimensions and used to form the seat. In an embodiment, a flexible substrate or fabric has crossing zig-zag patterns (or e.g., crossing sine wave patterns) used to form the seat. In an embodiment, the flexible substrate or the fabric has one of the patterns discussed above or another pattern adapted to withstand the flexible use by people. One such implementation places the sensing systems within materials forming the car seat, such as fabrics, leather, etc. In an embodiment, sensing systems are located within, or form, seats made of cloth. In an embodiment, sensing systems are located on seats made of cloth. In an embodiment, sensing systems are located on seats made of leather. In an embodiment, sensing systems are located within, or form, seats made of leather. In an embodiment, sensing systems are located on seats made of leather. In an embodiment, sensing systems are located within, or form, seats made of plastic. In an embodiment, sensing systems are located on seats made of plastic. In an embodiment, sensing systems are located proximate to and or otherwise operably located near a passenger's location.

With respect to the sensing systems operably connected to the seats and components of a vehicle, a transmitter transmits a unique frequency orthogonal signal on each of the transmitting antennas. Receiving antennas can receive the transmitted signals and/or respond to the capacitive interaction that can occur through usage of the material. A signal processor processes a measurement of the received signals and uses the measurements in order to form a heat map, or other set of data, reflecting the interaction that is occurring with the car seat. In an embodiment, each of the transmitting antennas and each of the receiving antennas functions as either a transmitting antenna or receiving antenna. In an embodiment, there is at least one transmitting antenna and a plurality of receiving antennas. In an embodiment, there is a plurality of transmitting antennas and at least one receiving antenna.

With reference to the sensing systems discussed above, various algorithms and techniques can be used in order to determine and enhance various characteristics that are to be sensed. In embodiments, the algorithms disclosed herein are used for seating. In embodiments, the algorithms are used for handlebars. In embodiments, the algorithms are used for sensing systems located within other vehicles or environments that use seats.

In embodiments, many of these algorithms are used with orthogonal frequency division multiplexing (OFDM) sensing. In an embodiment of OFDM sensing a plurality of frequency orthogonal signals are transmitted during an integration period. Received signals are processed using a Discrete Fourier Transform (DFT). In an embodiment, a Fast Fourier Transform (FFT) is used to process the signals. Processed signals are used in order to create a heat map.

In an embodiment, the algorithms are used in both handlebar and seating applications. The algorithms are adapted to provide core information to basic sensing and sensor stability for downstream applications and associated algorithms. By way of reference, FIG. 1 shows processed heatmap images of a user on a seat cushion. The image on the left shows deformation, with lighter brighter areas demonstrating more deformation. The middle image is a heatmap converted to grayscale. The right heatmap is a heatmap showing deformation and also light touches. These heatmaps are illustrative of the results of the methods discussed below. The methods discussed below take the results of measurements of received signals and refine the information in order to produce additional meaningful information.

An algorithm that is adapted to be implemented in vehicles is called "dynamic baseline." The dynamic baseline algorithm provides an assessment of the heatmap drift over time. By compensating for the heatmap drift that occurs over time the measurements that are taken as one moves forward in time are improved.

Using the dynamic baseline algorithm, drift in the heatmap is determined. When drift in the heatmap occurs over a specific threshold the sensor is adapted to recalibrate the heatmap in order to re-establish the baseline and improve the sensing of touch events. The amount of drift that occurs is determined when a heatmap having no touch events is compared to a baseline heatmap that may also be reflective of no touch events. This permits the establishment of a new baseline.

The re-establishment of the baseline heat map can be accomplished by using a "No Touch" classification "Sensormode." It should be understood by those of skill in the art that the names referred to in reference to the algorithms are to some extent arbitrary and that different names may be utilized according to the preferences of the engineers and programmers, however the steps that are implemented by the algorithms are still adapted to produce the results that are desired to be achieved. Below is pseudocode that is representative of the dynamic baseline algorithm:

Pseudocode:

```
CLASSIFY if the user is in "Proximity" or "Touch" with sensor
IF NOT
    THEN take the summation of the entire heatmap
    IF the heatmap summation is above or below a set threshold
        TAKE new baseline
CHECK heatmap again based on a fixed rate
```

The "Sensormode" is a classification of "No Touch", "Proximity", "Touch" states between the user and the sensor. Determination of "No Touch" and sensed events ("Proximity" or "Touch") is accomplished through thresholds that are adapted to be customized to the sensor and application. Classification of these events is used for execution of algorithms, such as dynamic baseline discussed above. In an embodiment, with respect to the seat, proximity detection through "Sensormode" is capable of object detection at distances of up to 30 cm off the seat surface due to the sensor grids integrated in the seat back and seat cushion. In an embodiment, with respect to the seat, proximity detection through "Sensormode" is capable of object detection at distances of up to more than 30 cm off the seat surface due to the sensor grids integrated in the seat back and seat cushion. In an embodiment, with respect to the seat, proximity detection through "Sensormode" is capable of object detection at distances of up to 60 cm off the seat surface due to the sensor grids integrated in the seat back and seat cushion. In an embodiment, with respect to the seat, proximity detection through "Sensormode" is capable of object detection at distances of up to one meter off the seat surface due to the sensor grids integrated in the seat back and seat cushion. In an embodiment, with respect to the seat, proximity detection through "Sensormode" is adjustable and object detection may range from 10 cm up to 1 m off the seat surface based on the settings of the sensor grids integrated in the seat back and seat cushion.

Pseudocode:

```
FIND the minimum singular heatmap value
TAKE the summation of the entire heatmap
IF the heatmap summation is greater than "Proximity" threshold
    THEN Sensormode is in the "No Touch" state
ELSE IF the heatmap summation is less than or equal to the "Proximity"
threshold AND the minimum tixel value is greater than the "Touch"
threshold
    THEN Sensormode is in the "Proximity" state
ELSE
    THEN Sensormode is in the "Touch" state
CHECK for every frame
```

Heatmap dynamic range mapping is a method that maps heatmap signal outputs into an alternative scale with known fixed dynamic range. This method is adapted to be applied to both handlebar and seating scenarios. The method re-casts heatmap values into a specific range. A "tixel" is the name given to each point sensed by the sensing device and subsequently represented in a processed display, such as a heatmap. The terms "tixel" and "taxel" are often used interchangeably and generally refer to the same concept. A taxel is a part of the touch sensitive device that is able to detect touch events and is generally represented by a tixel in the heatmap. It should be understood that touch events can be detected capacitively across the touch sensitive device, the taxel, is that portion of the touch sensitive device that corresponds to where events proximate to its location result in a touch event. For example, the taxel may correspond to where transmitting and receiving conductors intersect. However, in some embodiments, taxels refer to areas where conductors approach each other so that a touch event proximate to one conductor is able to be determined by the other conductor.

In an embodiment, the scale chosen is to recast the heatmap values in dB into an 8-bit range [0,255] as this range is compatible with image processing. In an embodiment, heatmap values are recast into a [0,1] range.

Additionally, determination of the mapping between an 8-bit range to the heatmap range often takes different forms depending on the applications. For example, in an embodiment, global mins and maxes are determined. In taking the minimum and maximum tixel values over the entire heatmap, the scaling is applied to all associated heatmap values accordingly through interpolation.

In an embodiment, receiving mins and maxes are determined. In taking the minimum and maximum of a single receiving line (conductor) value in the heatmap, the scaling is applied to all associated singular RX values accordingly through interpolation.

In an embodiment, transmitting mins and maxes are determined. In taking the minimum and maximum of a single transmitting line (conductor) value in the heatmap, the scaling is applied to all associated single transmitting values accordingly through interpolation.

In an embodiment, fixed mins and maxes are determined. The entire heatmap is scaled based on fixed min and max values as determined by other factors. These may scale the entire heatmap or targeted areas such as RX conductors, TX conductors, or single tixels.

Pseudocode:
FIND min and max thresholds based on a particular the (a-d) variants
LOOP through every value in the heatmap
FOR a particular heatmap value, RETURN new value using interpolation of the min and max thresholds The application of dynamic baselining and rebaselining are generally useful in obtaining the most information from touch events occurring on or near a vehicle seat (or a handlebar, or other surface within or on the vehicle in which information may be needed to obtain). Changes to the electrical conditions within a vehicle due to the activation of heaters, etc., can impact sensing within the vehicle. Utilizing the algorithms discussed above the information obtained can be improved upon.

Another method of improving the situation is through the use of touch calibration. Touch calibration occurs through the normalization of the dynamic range of individual tixels in a sensor grid. Touch calibration is performed with sensors integrated into complex systems after which results in varying touch responses for equivalent touch interactions have been determined to occur. Through the implementation of touch calibration, the touch response is "flattened" across the entire sensor grid. By flattened it means that the similar touch events will result in similar measured responses so that there is not any one tixel that is providing anomalous responses.

In a seating environment, deformation sensing ("sinking") is enabled using touch calibration algorithms through a deformation-specific dynamic range, in which two touch calibrations are implemented. A light touch calibration is a calibration of touch response for light touches, i.e. a touch response that is in light contact with the seat surface that also does not result in the deformation of the seat surface. A max touch deformation is a calibration of the touch response for a sensed event that results in the seat surface deformed to its maximum capability within the intended use, i.e. a deformation that will not result in the damage or destruction of the seat and/or sensor and has repeatability with use.

Deformation and sinking events are then quantified by scaling the heatmap response between these calibration events. Responses are ultimately determined by the sensor and its integration, and its response may be linear or nonlinear.

Pseudocode:
RECORD and save heatmap tixel values under light touch conditions
RECORD and save heatmap tixel values under max deformation conditions
IMPORT light touch and max deformation calibrations
USE variant (#3d) of heatmap dynamic range mapping algorithm previously described with the light touch and max deformation threshold conditions on a per tixel basis.

Algorithms Used for Seating

The algorithms set forth below are discussed within the context of seating applications. However, it should be understood that principals and results of the algorithms are further applicable to handlebar, wheel, and other vehicle based applications within the appropriate context of the environment.

Re-injection postural compensation is a technique that searches regions of the heatmap for signal gain to re-scale heatmap values after baselining. Touch events in seating are characterized by relative levels of signal loss (quantified by negative value in dB after baselined) whereas events resulting in signal gain (quantified by positive values in dB after baselined) are a result of signal existing on the user from associated touch events and re-injecting back into the seat sensor typically in non-contact locations. Re-injection events are associated with the user holding postures away from seat ground, typical when postured with the user's back fully removed from the seat back sensor. As a result, these events cause heatmap touch signals to vary with posture. Thus, to compensate for signal variation, areas of the heatmap are scanned to find and track shifts in signal re-injection. If significant re-injection is located, this factor is subtracted from the existing heatmap. This effectively offsets the heatmap to a new baseline value and from subsequent testing is able to stabilize the heatmap, resulting in a heatmap that is decoupled from postural variation.

Variants of re-injection compensation hold the same variant found in heatmap dynamic range mapping and can be applied to sub-regions of the heatmaps, RX conductor only, TX conductor only, or single tixels, and thus, the search may not occur over the entire heatmap and may be restricted to portions of the heatmap.

Pseudocode:
SEARCH heatmap for positive signal gain. Search can be restricted to key sensor areas and may be repeated for other sensor areas
FIND maximum signal gain in search area
SUBTRACT maximum signal gain from heatmap. This operation may only occur for the search area.

In an embodiment, physical location mapping can be accomplished using sub-tixel image re-scaling. In an embodiment, a series of algorithms are implemented to map a singular pixel coordinate from an image to a known physical location on a seat using line-line intersection. This algorithm is adapted to provide the output locations such an outline, contour, and/or center found by an image processing toolset to reflect the physical location on the seat while also increasing the sensor resolution of touch events.

In an embodiment, sub-tixel image re-scaling is performed to "granularize" the heatmap into the required resolution. Without re-scaling, a sensor with 20 mm tixel spacing achieves a minimum resolution of 20 mm. To yield resolutions at smaller scales, re-scaling the heatmap to include interpolated data can achieve smaller effective resolutions. For example, the same 20 mm tixel spacing sensor can achieve 5 mm data spacing by re-scaling the heatmap by a factor of 4 in a single direction. The new "granularized" data within the heatmap is referred to as sub-tixels, and their values are best determined through interpolation. Also, re-scaling is typically performed on an image rather than the heatmap sensor data.

Pseudocode:
CONVERT heatmap to image. Requires heatmap dynamic range mapping prior to conversion.
RESCALE image to larger image. Rescale size is determined by the resolution required.
RECORD original tixel pixel locations in the new rescaled image. Their pixel locations are required to map pixel locations to the seat's physical geometry.

The tixel search method is performed when a pixel of interest is required to be mapped to the physical seat geometry. The pixel of interest may be generated by software such as OpenCV or other algorithms. For a given pixel of interest, its location relative to four tixels (and their associated pixel locations) can be determined prior to physical mapping calculations. Typically, a binary search is performed to find the locations of these tixels.

Pseudocode:
FIND the location of four nearby tixels in relation to the pixel of interest.

In an embodiment, physical mapping is achieved using line-line intersection. This is the geometric calculation used to map pixel locations from an image to non-rectangular physical locations on the seat surface. Whereas the heatmap image contains a rectangular grid, the sensor physical locations are typically non-rectangular, and thus the mapping must account for quadrilateral mappings. This is most efficiently achieved with line-line intersection calculations shown below.

Pseudocode:
RECORD the physical locations of the tixels found from the search.
CALCULATE the proportional location by percent of the pixel of interest within locations of tixel rectangular grid segment from the pixel coordinates
DETERMINE the equivalent points on the physical location grid based on the proportional locations from pixelspace on the quadrilateral line segments. This should yield four points.

FIG. 1 shows a line-line intersection drawing on which these calculations are based. Based on the four points, CALCULATE the physical location of the pixel of interest based on the following formula for Line-Line intersection.

The intersection of two lines L1 and L2 in two dimensions with, L1 containing the points (x1, y1) and (x2, y2), and L2 containing the points (x3, y3) and (x4, y4), is given by:

$$x = \frac{\left\| \begin{vmatrix} x_1 & y_1 \\ x_2 & y_2 \end{vmatrix} \begin{vmatrix} x_1 & 1 \\ x_2 & 1 \end{vmatrix} \right\|}{\left\| \begin{vmatrix} x_3 & y_3 \\ x_4 & y_4 \end{vmatrix} \begin{vmatrix} x_3 & 1 \\ x_4 & 1 \end{vmatrix} \right\|} = \frac{\left\| \begin{vmatrix} x_1 & y_1 \\ x_2 & y_2 \end{vmatrix} x_1 - x_2 \right\|}{\left\| \begin{vmatrix} x_3 & y_3 \\ x_4 & y_4 \end{vmatrix} x_3 - x_4 \right\|} \quad (1)$$

$$y = \frac{\left\| \begin{vmatrix} x_1 & y_1 \\ x_2 & y_2 \end{vmatrix} \begin{vmatrix} y_1 & 1 \\ y_2 & 1 \end{vmatrix} \right\|}{\left\| \begin{vmatrix} x_3 & y_3 \\ x_4 & y_4 \end{vmatrix} \begin{vmatrix} y_3 & 1 \\ y_4 & 1 \end{vmatrix} \right\|} = \frac{\left\| \begin{vmatrix} x_1 & y_1 \\ x_2 & y_2 \end{vmatrix} y_1 - y_2 \right\|}{\left\| \begin{vmatrix} x_3 & y_3 \\ x_4 & y_4 \end{vmatrix} y_3 - y_4 \right\|}, \quad (2)$$

Where $$\begin{vmatrix} a & b \\ c & d \end{vmatrix}$$

denotes a determinant. This corresponds to simultaneously solving $$\begin{vmatrix} x & y & 1 \\ x_1 & y_1 & 1 \\ x_2 & y_2 & 1 \end{vmatrix} = 0 \quad (3)$$

-continued $$\begin{vmatrix} x & y & 1 \\ x_3 & y_3 & 1 \\ x_4 & y_4 & 1 \end{vmatrix} = 0 \quad (4)$$

For x and y.

The intersection of two lines given in trilinear coordinates as:

$$l_1\alpha + m_1\beta + n_1\gamma = 0 \quad (5)$$

$$l_2\alpha + m_2\beta + n_2\gamma = 0 \quad (6)$$

is $$\begin{vmatrix} m_1 & m_2 \\ n_1 & n_2 \end{vmatrix} : \begin{vmatrix} n_1 & n_2 \\ l_1 & l_2 \end{vmatrix} : \begin{vmatrix} l_1 & l_2 \\ m_1 & m_2 \end{vmatrix}. \quad (7)$$

Three lines in trilinear coordinates, $$l_1\alpha + m_1\beta + n_1\gamma = 0 \quad (8)$$

$$l_2\alpha + m_2\beta + n_2\gamma = 0 \quad (9)$$

$$l_3\alpha + m_3\beta + n_3\gamma = 0 \quad (10)$$

concur if their trilinear coordinates satisfy.

$$\begin{vmatrix} l_1 & m_1 & n_1 \\ l_2 & m_2 & n_2 \\ l_3 & m_3 & n_3 \end{vmatrix} = 0, \quad (11)$$

In which case the point is:

$$m_2n_3-n_2m_3; n_2l_3-l_2n_3; l_2m_3-m_2l_3. \quad (12)$$

Three lines in Cartesian coordinates concur if the coefficients of the lines:

$$A_1x + B_1y + C_1 = 0 \quad (13)$$

$$A_2x + B_2y + C_2 = 0 \quad (14)$$

$$A_3x + B_3y + C_3 = 0 \quad (15)$$

satisfy $$\begin{vmatrix} A_1 & B_1 & C_1 \\ A_2 & B_2 & C_2 \\ A_3 & B_3 & C_3 \end{vmatrix} = 0. \quad (16)$$

In three dimensions, the algebra becomes more complicated. The intersection of two lines containing the points $x1=(x1, y1, z1)$ and $x2=(x2, y2, z2)$, and $x3=(x3, y3, z3)$ and $x4=(x4, y4, z4)$, respectively, can also be found directly by simultaneously solving:

$$x=x_1+(x_2-x_1)s \quad (17)$$

$$x=x_3+(x_4-x_3)t \quad (18)$$

Together with the condition that the four points be coplanar (i.e., the lines are not skew), $$\begin{vmatrix} x_1 & y_1 & z_1 & 1 \\ x_2 & y_2 & z_2 & 1 \\ x_3 & y_3 & z_3 & 1 \\ x_4 & y_4 & z_4 & 1 \end{vmatrix} = (x_3 - x_1) \cdot [(x_2 - x_1) \times (x_4 - x_3)] = 0 \quad (19)$$

For x=(x, y, z), eliminating s and t. This set of equations can be solved for s to yield.

$$s = \frac{(c \times b) \cdot (a \times b)}{|a \times b|^2}, \quad (20)$$

Where $$a \equiv x_2 - x_1 \quad (21)$$

$$b \equiv x_4 - x_3 \quad (22)$$

$$a \equiv x_3 - x_1 \quad (23)$$

The point of intersection can then be immediately found by plugging back in for s to obtain:

$$x = x_1 + a\frac{(c \times b) \cdot (a \times b)}{|a \times b|^2}. \quad (24)$$

A slightly more symmetrical and concise form can be obtained by additionally defining.

$$v = \hat{a} \times \hat{b} \quad (25)$$

$$s_1 = \frac{\det(c\,\hat{b}\,\hat{v})}{|v|^2} \quad (26)$$

$$s_2 = \frac{\det(c\,\hat{a}\,\hat{v})}{|v|^2}, \quad (27)$$

Where $\hat{x}$ denotes a unit vector, then $$x = \frac{1}{2}(x_1 + \hat{a}s_1 + x_3 + \hat{b}s_2) \quad (28)$$

Using the calculations above, the pixel locations can be mapped from an image to non-rectangular physical locations on the seat surface. This information is able to provide more nuanced information regarding activity occurring in the seat.

An aspect of the present disclosure is a sensing system. The sensing system comprising a group of transmitting antennas operably connected to a car seat, each transmitting antenna adapted to transmit a signal that is orthogonal to each other signal transmitted during an integration period, a plurality of receiving antennas, each one of the plurality of receiving antennas adapted to receive transmitted signals; and a processor adapted to determine a measurement of the transmitted signals received and create a heatmap, wherein a heatmap summation is taken during no-touch events, compared to a baseline heatmap, and a new baseline heatmap recalibrated if a threshold is exceeded.

Another aspect of the disclosure is a method for sensing. The method comprising transmitting a signal that is orthogonal to each other signal transmitted during an integration period on each of a group of transmitting antennas operably connected to a car seat; and determining a measurement of the transmitted signals received; creating a heatmap summation during no-touch events; comparing the heatmap summation to a baseline heatmap; and recalibrating a new baseline heatmap if a threshold is exceeded.

While the invention has been particularly shown and described with reference to a preferred embodiment thereof, it will be understood by those skilled in the art that various changes in form and details may be made therein without departing from the spirit and scope of the invention.

The invention claimed is:

1. A sensing system, comprising:
a group of transmitting antennas operably connected to a car seat, each transmitting antenna adapted to transmit a signal that is orthogonal to each other signal transmitted during an integration period,
a plurality of receiving antennas, each one of the plurality of receiving antennas adapted to receive transmitted signals; and
a processor adapted to determine a measurement of the transmitted signals received and create a heatmap, wherein a heatmap summation is taken during no-touch events, compared to a baseline heatmap, and a new baseline heatmap recalibrated if a threshold is exceeded.

2. The sensing system of claim 1, wherein the processor is adapted to determine a minimum singular heatmap value.

3. The sensing system of claim 2, wherein the heatmap summation is taken after the minimum singular heatmap value is determined.

4. The sensing system of claim 3, wherein the processor is adapted to determine that the sensing system is in a proximity state if the heatmap summation is less than or equal to a proximity threshold and the minimum singular heatmap value is greater than a touch threshold.

5. The sensing system of claim 1, wherein the threshold is a deviation from the baseline heatmap with a no touch event.

6. The sensing system of claim 1, wherein the processor is adapted to determine a minimum and maximum for each tixel in the heatmap and scale the heatmap.

7. The sensing system of claim 1, wherein the processor is adapted to determine a minimum and maximum for a receiving conductor and scale the heatmap.

8. The sensing system of claim 1, wherein the processor is adapted to determine a minimum and maximum for a transmitting conductor and scale the heatmap.

9. The sensing system of claim 1, wherein the processor is adapted to determine regions of signal gain.

10. The sensing system of claim 9, wherein the processor is adapted to rescale the heatmap based on the determined regions of signal gain.

11. A method for sensing, comprising:
transmitting a signal that is orthogonal to each other signal transmitted during an integration period on each of a group of transmitting antennas operably connected to a car seat; and
determining a measurement of the transmitted signals received;
creating a heatmap summation during no-touch events;
comparing the heatmap summation to a baseline heatmap; and recalibrating a new baseline heatmap if a threshold is exceeded.

12. The method of claim 11, further comprising determining a minimum singular heatmap value.

13. The method of claim 12, wherein a summation of the heatmap is taken after the minimum singular heatmap value is determined.

14. The method of claim 13, further comprising determining that the sensing system is in a proximity state if the heatmap summation is less than or equal to a proximity threshold and the minimum singular heatmap value is greater than a touch threshold.

15. The method of claim 11, wherein the threshold is a deviation from a baseline heatmap with a no touch event.

16. The method of claim 11, further comprising determining a minimum and maximum for each tixel in a heatmap and scaling the heatmap.

17. The method of claim 11, further comprising determining a minimum and maximum for a receiving conductor and scaling the heatmap.

18. The method of claim 11, further comprising determining a minimum and maximum for a transmitting conductor and scaling the heatmap.

19. The method of claim 11, further comprising determining regions of signal gain.

20. The method of claim 19, further comprising rescaling the heatmap based on the determined regions of signal gain.

* * * * *